United States Patent [19]

Stallings

[11] Patent Number: 4,915,358

[45] Date of Patent: Apr. 10, 1990

[54] COMPOUND ANGLE DRIVE FOR RAISING AND LOWERING VEHICLE SPARE TIRE

[76] Inventor: Hulon D. Stallings, 8730 Sarah La., Grosse Isle, Mich. 48138

[21] Appl. No.: 214,161

[22] Filed: Jul. 5, 1988

[51] Int. Cl.$^4$ .............................................. B66D 1/00
[52] U.S. Cl. ................................... 254/323; 464/137; 414/463; 224/42.23
[58] Field of Search .................... 254/323; 224/42.23, 224/42.21; 464/137; 414/463

[56] References Cited

U.S. PATENT DOCUMENTS

| | | | |
|---|---|---|---|
| 1,143,054 | 6/1915 | Lloyd | 464/137 |
| 2,097,062 | 10/1937 | Harris | 464/137 X |
| 2,148,975 | 2/1939 | Agren | 464/137 X |
| 2,560,958 | 7/1951 | King | 464/137 X |
| 2,661,130 | 12/1953 | Evans | 224/42.21 X |
| 2,688,372 | 9/1954 | Walker | 224/42.23 X |
| 3,330,431 | 7/1967 | Knecht | 224/42.23 X |
| 3,539,152 | 11/1970 | Paul | 224/42.23 X |
| 3,856,167 | 12/1974 | Yasue | 224/42.23 X |
| 3,865,264 | 2/1973 | Kuhns | 224/42.23 X |
| 4,544,136 | 10/1985 | Denman | 254/323 |

FOREIGN PATENT DOCUMENTS 1327791 8/1973 United Kingdom ................ 464/137
2072109 9/1981 United Kingdom ............ 224/42.21

OTHER PUBLICATIONS

IBM Technical Disclosure Bulletin, vol. 15, No. 6, 11/1972, Johnson.

Primary Examiner—Katherine A. Matecki
Attorney, Agent, or Firm—Dykema Gossett

[57] ABSTRACT

The spare wheel lift and drive assembly is for a vehicle having a frame, a downwardly facing spare rear wheel mount bracket upon the underside of the frame, a lift mechanism depending from the bracket including a cable extending therefrom and rotative drive arranged upon a first axis connected to the cable for selectively extending and retracting a cable, and a spare wheel support connected to the cable. A compound angle drive is provided for operating the lift mechanism.

9 Claims, 2 Drawing Sheets

COMPOUND ANGLE DRIVE FOR RAISING AND LOWERING VEHICLE SPARE TIRE

FIELD OF INVENTION

The present invention relates to raising and lowering a vehicle spare tire and more particularly to a compound angle drive therefor.

BACKGROUND OF INVENTION

Previously in vehicles and particularly in vans, a spare tire is stored and suspended upon the underside of a vehicle at the rear thereof. There have been employed lift assemblies which underlie the bracket which receives a spare tire, which includes a cable extending therefrom and a rotative drive arranged upon a first axis connected to the cable for selectively extending and retracting the cable on the end of which a spare wheel support is connected. Upon selective rotation of the rotative drive, the cable is extended and alternately retracted, for lowering or raising the spare tire. With this construction there has been a remote-controlled drive mechanism connected to the rotative drive of the lift assembly employing a conventional universal joint. In view of the limited amount of use of the lift assembly, the cost and installation of a conventional universal joint is excessive.

SUMMARY OF INVENTION

An important feature of the present invention is to provide an improved compound angle drive for raising and lowering a vehicle spare tire and wherein an elongated drive tube extends from the vehicle and at its inner end is flexibly and pivotally connected to the input shaft of the lift unit without the use of a conventional universal joint.

Another feature is to provide a flexible connection whereby a drive tube extending at an angle in the range of 150 to 180 degrees with respect to the axis of the drive shaft of the lift unit may be connected thereto without the use of a universal joint but incorporating a universal type of pin and slot drive connection as will accomplish the same results at less expense and less installation time.

Another feature is to provide upon the rotation drive for the lift unit a drive sleeve and slotted disc flexibly connected to a plurality of pins parallel to a second axis, mounted within a drive cup upon the end of a drive tube arranged upon a second axis and wherein the pin and disc connection provides for varying the angular relation between the first and second axes while maintaining the drive relationship therebetween.

These and other objects will be seen from the following specification and claims in conjunction with the appended drawings.

THE DRAWINGS

FIG. 1 is a fragmentary exploded view of the underside of a vehicle, such as a van, illustrating a bracket for supporting a vehicle spare tire and a cable lift assembly connected thereto and including the present compound angle drive.

FIG. 2 a fragmentary perspective view of the assembled bracket and lift assembly and compound angle drive with the extended cable connected to a spare tire, fragmentarily shown, and in a lowered position relative to the vehicle body.

It will be understood that the above drawings illustrate merely a preferred embodiment of the invention, and that other embodiments are contemplated within the scope of the claims hereafter set forth.

DETAILED DESCRIPTION OF THE PREFERRED EMBODIMENT OF THE INVENTION

Figure 1:
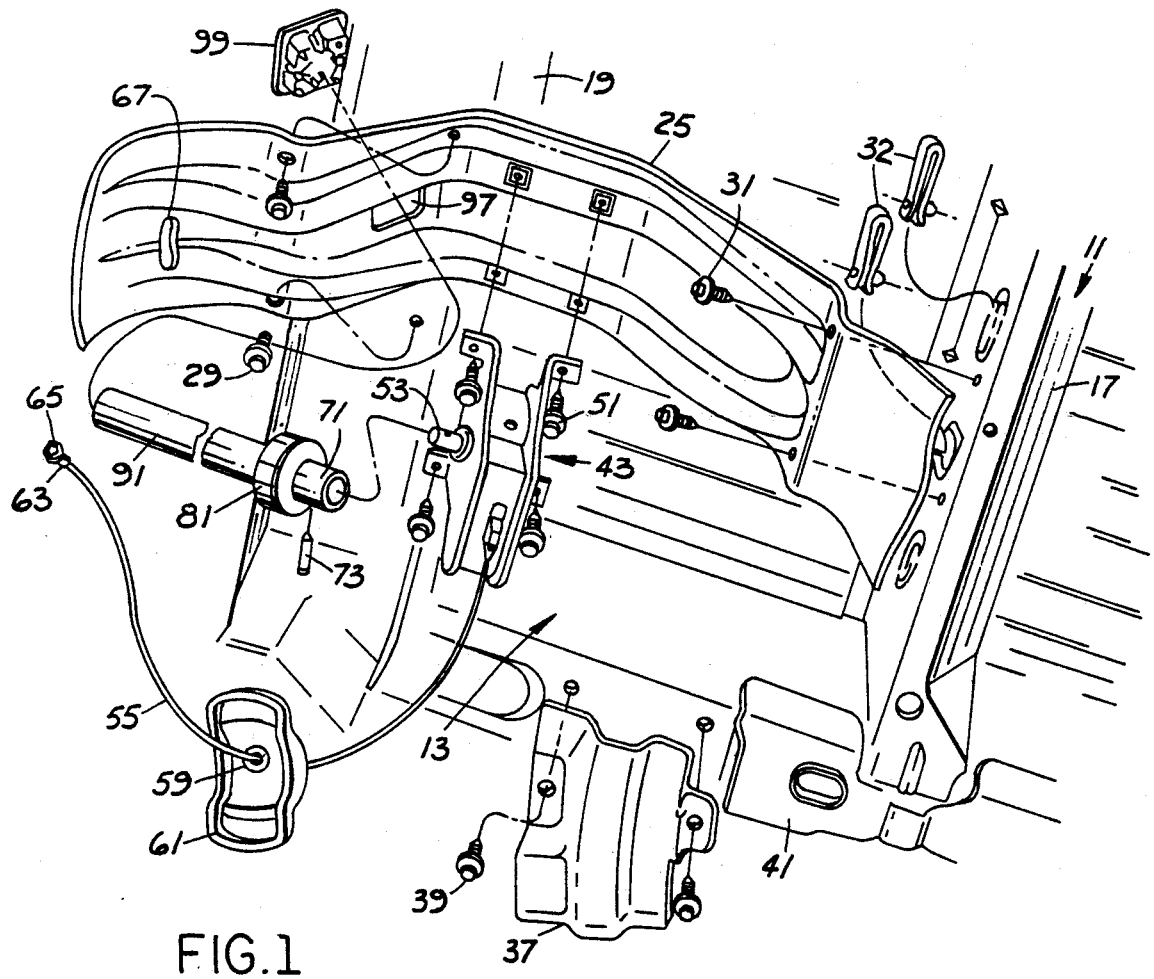
Figure 3:
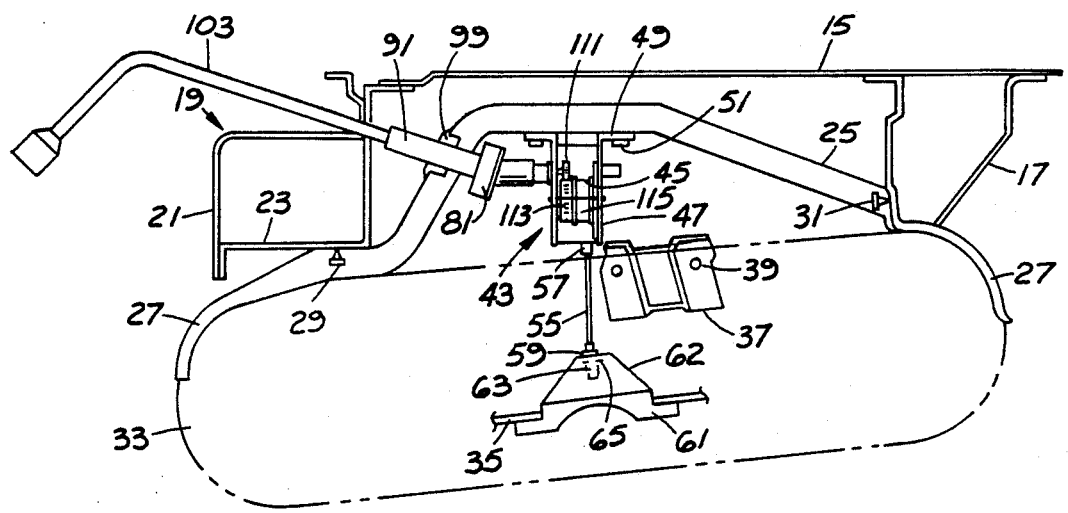
FIG. 3 is a longitudinal section of a portion of a vehicle body illustrating the assembly of the spare tire into a supporting bracket held in place by the lift assembly.

Referring to the drawing, a vehicle 11 is fragmentarily shown, such as a van, though not limited thereto, which includes a rear undersurface 13, FIGS. 1 and 3, the rear floor 15 and a vehicle frame 41 fragmentarily shown which includes rear floor support cross member 17 and spaced therefrom the transverse rear panel 19 including outer rear sill 21 connected to the floor 15 and the inner sill 23.

A spare wheel mount bracket 25 includes opposed arcuate depending portion 27. A forward portion of the bracket 25 is secured to cross member 17 by fasteners 31, and with a rear portion of the bracket 25 secured to inner sill 23 by the fasteners 29. In the exploded view, FIG. 1, as illustrated a pair of nut support clips 32, are shown adapted for assembly over apertured portions of cross member 17 for aligning the nut thereon with fastener 31.

Figure 2:
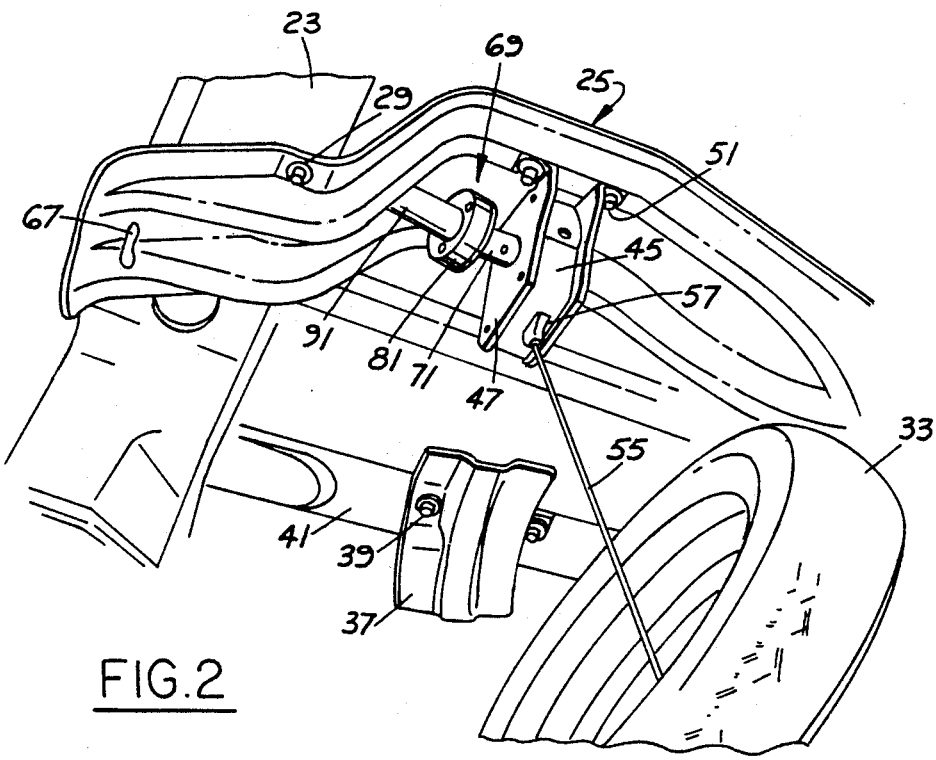

The spare wheel 33, FIGS. 2 and 3, having a central or apertured mount flange 35 further bears against an intermediate support bracket 37 secured by fasteners 39 to vehicle frame 41 and cooperates with bracket 25 for mounting and storing the spare tire 33.

For this purpose there is provided a lift assembly or mechanism 43 which may have a gear and pinion lift assembly in the casing 45 and a pair of opposed side plates 47 with mount flanges 49 bearing against a central undersurface of the bracket 25 and secured thereto by fasteners 51, FIGS. 1, 2 and 3.

The lift assembly 43 includes a rotatable drive shaft 53 adapted to rotate a suitable drum 115 upon which is anchored and wound the flexible cable 55. Input shaft 53 is arranged upon a first axis 54, FIG. 4, and in one embodiment of the lift assembly includes pinion 111 in mesh with gear 113 upon the axis of rotation of the drum 115 as one means for rotating the drum for advancing or retracting the cable 55 through the guide 57 which may be made from a plastic material.

Cable 55 extends through a flanged sleeve 59 in the spare wheel support 61, constructed of a non-metallic material and which includes a centering cone 62 in cooperative registry within the conventional central aperature of wheel flange 35, FIG. 3. Cable 55 terminates in an anchor tube 63 secured upon the end thereof and including an enlarged head 65 adapted to operatively engage tire support 61. Through the rotation of drive shaft 53 upon axis 54, the cable 55 may be advanced or retracted. The cable 55 is shown in a fully retracted position in FIG. 3, with the lift assembly 43 holding the cable 55 and wheel support 61 in operative supporting relation with respect to wheel flange 35 thereby holding the spare tire 33 snugly within the corresponding brackets 25 and 37.

Key hole slot 67 extends through a portion of bracket 25 in FIG. 1 adapted to anchor cable 55 and the enlarged head 65 thereon when no tire is stored within bracket 25. In that case the cable 55 is retracted so as to maintain the cable in a taut relationship with respect to the keyhold slot 67.

COMPOUND ANGLE DRIVE FOR RAISING AND LOWERING A VEHICLE SPARE TIRE

Figure 7:
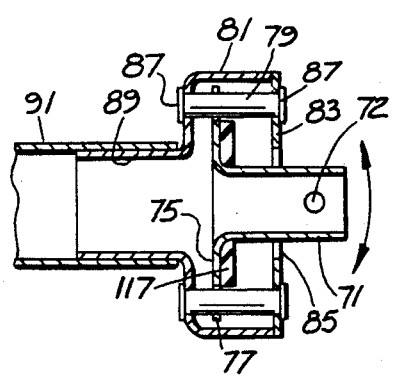
FIG. 7 is a section taken in the direction of arrows 7—7 of FIG. 6.

The compound angle drive is generally indicated at 69, FIG. 2. It includes a sleeve 71 having a transverse aperture 72, FIG. 7, assembled over the input shaft 53 and secured thereto by the pin 73. Transverse drive disc 75 is mounted upon one end of sleeve 71 and includes around its periphery a series of radial outwardly opening slots 77. The slots 77 cooperatively and loosely receive respectively the corresponding drive pins 79. These pins are in the form of hollow rivets which extend through the drive cup or annular housing 81 having an end plate 83 with an axial aperture 85 in the end plate to cooperatively and loosely receive the sleeve 71.

Figure 4:
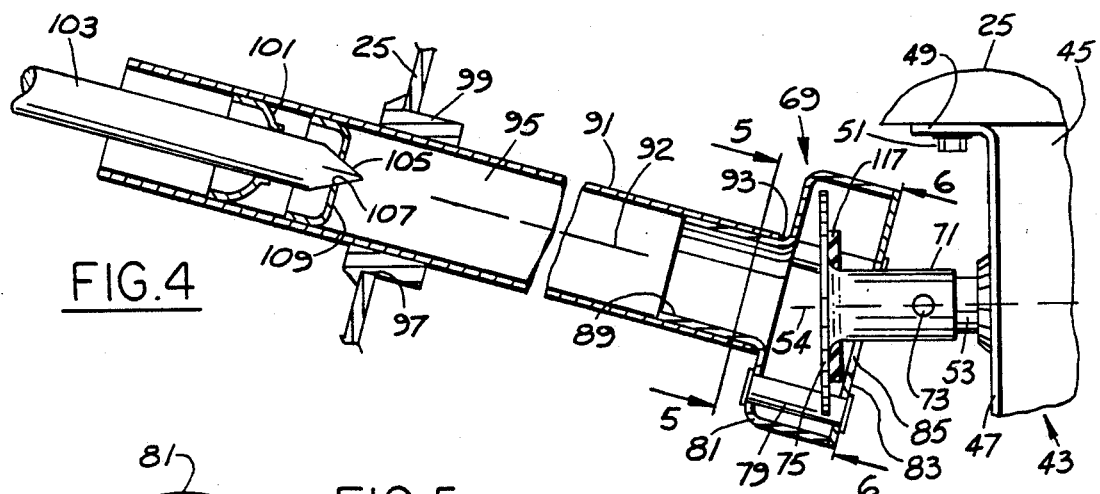
FIG. 4 is a fragmentary longitudinal section of the present compound angle drive with the lift assembly fragmentarily shown, and on an increased scale.
Figure 5:
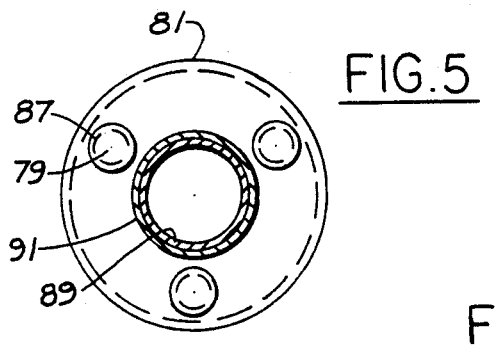
FIG. 5 is a section taken in the direction of arrows 5—5 of FIG. 4.
Figure 6:
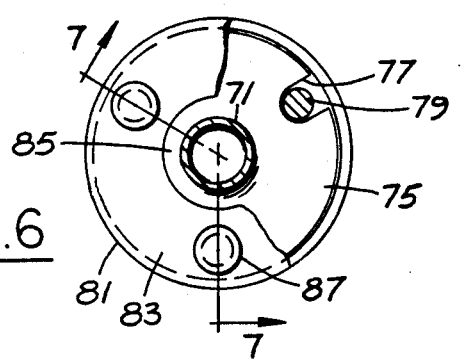
FIG. 6 is a fragmentary section taken in the direction of arrows 6—6 of FIG. 4.

The cup 81 terminates in a mount sleeve 89 which is projected into one end of the drive tube 91 and secured thereto as by the welds at 93, FIG. 4. The drive tube 91 is selectively arranged upon a second axis 92 which intersects and is normally arranged at an obtuse angle with respect to the first axis 54. Thus, the present compound angle drive functions similarly to a universal joint with a greatly reduced construction establishing a rotative drive between the rotatable tube 91 on axis 92 and the input shaft 53 on axis 54 for the lift assembly 43.

In the illustrative embodiment, this angle is preferably in the range of 150 to 180 degrees, thereby providing a flexible drive connection between the manually rotatable tube 91 and the input or drive shaft 53, FIG. 4. Drive tube 91 has a bore 95 and the tube extends outwardly from the lift unit 43 and extends through an aperture 97 provided in the bracket 25. A suitable grommet made of a non-metallic material is located in the aperture 97 between the bracket 25 and tube 91.

Throated guide sleeve 101 is nested within an outer end portion of tube 91 and is secured therein as by welding or otherwise. The sleeve 101 is adapted to cooperatively receive one end of a jack handle 103 whose end portion has a series of tapered flats 105 of polygonal form. The tapered flats 105 are adapted for registry within a corresponding polygonal opening 107 provided within the drive sleeve 109 which is nested and secured within tube 91 inwardly of the throated guide sleeve 101 as shown in FIG. 4.

In use and to provide a rotative drive for the tube 91 for advancing or retracting the cable 55, all that is necessary is to axially project the jack handle 103 into the outer end of the tube 91 through the guide 101 and into the drive sleeve 109 and to thereafter rotate the jack handle 103 manually.

The present compound angle drive 69, shown in cross-section, FIG. 4, provides in effect a universal connection between the drive tube 91 and the input shaft 53 for the lift assembly 43. In the illustrative embodiment, the second axis 92 is arranged at an obtuse angle with respect to the first axis 54 of approximately 150 degrees or stated differently at an included angle of 30 degrees approximately. This angle may be varied between 0, with the axes in alignment, and generally up to 150 degrees or in the range between 150 or 180 degrees, for illustration.

Viewing FIG. 4, and the relationship of the drive disc 75 within the cup 81, it would appear that the relative tilting movement of these two axes is limited to approximately a maximum of 30 degrees, for illustration.

The connection between the corresponding drive disc 75 and the pins or rivets 79 arranged around and parallel to the axis 92 is such that there is a continued drive relationship between tube 91 and input shaft 53. It is contemplated that the number of drive pins 79 could be increased, though three pins are shown in the illustrative embodiment as the minimum number of such drive pins or rivets. By increasing the number of drive pins 79 and the corresponding slots 77 for matching the pins 79, the transmission of power can be increased.

As shown in FIG. 1, the tire support 61 is of a general rectangular shape so that it may be disassembled through the aperture within the tire flange 35 for assembly or disassembly with respect to the present lift unit 43.

The compound angle drive 69 may be used with other mechanisms for various purposes.

Referring once again to FIGS. 4 and 7, the compound angle drive includes an isolator 117 in the form of a washer which is placed over the sleeve 71 against the front face of the drive disc 75. The isolator, as an example, is made from urethane, has an outside diameter of 1¼ inches, and a thickness of 3/16 inch. The purpose of the isolator 117 is to dampen or to lessen the vibrations.

The method of making a compound angle drive for a shaft rotatable on a first axis disclosed by this invention comprises the following steps:

(1) assembling the mount sleeve of a drive cup into one end of a drive tube arranged upon a second axis and securing the cup thereto;

(2) assembling a drive disc upon a drive sleeve upon the interior of the cup, the disc having a plurality of peripheral radial slots therein;

(3) loosely assembling an apertured cover over the drive sleeve enclosing the cup;

(4) assembling a plurality of drive pins in a circle around the second axes through the cup and cover and through the slots respectively; and (5) riveting the ends of the pin to the cup and cover, for entrapping the drive disc within the cup with a flexible drive connection to the pin, the second axis being variably set at an angle to the first axis in the range of 150 to 180 degrees, approximately, the drive sleeve being adapted for assembly and securing over the shaft.

Having thus described my invention, reference should now be had to the following claims:

I claim:

1. A spare wheel lift and drive assembly for a vehicle having a frame, a downwardly facing mount bracket secured upon the underside of the frame adapted to receive a spare wheel, a lift mechanism centrally underlying the bracket and secured thereto, including a cable extending therefrom and a rotative drive arranged upon a first axis connected to the cable for selectively extending and retracting said cable and a spare wheel support connected to said cable, the improvement comprising:

a compound angle drive extending through said bracket upon a second axis intersecting and selectively arranged at an angle between 150 and 180 degrees relative to said first axis, and at one end universally connected to said rotative drive, whereby on selective rotation of said drive means the cable and wheel support retract against said spare wheel holding said wheel support and wheel in compressive retaining engagement with said mount bracket, and upon rotation in the opposite direction lowering said wheel to the ground surface;

said compound angle drive including an elongated drive tube arranged on said second axis, extending through said bracket and open at one end;

said compound angle drive means including a drive cup upon the other end of said tube;

a plurality of parallel angularly spaced drive pins arranged in a circle around said second axis and secured within said drive cup;

a drive sleeve coaxially mounted upon said rotative drive and secured thereto; and a drive disc upon one end of said drive sleeve and secured thereto, said drive disc being nested within said cup and including a plurality of spaced peripheral radial slots cooperatively receiving said drive pins respectively, said drive sleeve and said drive tube rotating in unison, an end plate fixed to said drive cup, said end plate closing said cup and enclosing said drive disc, said drive pins being secured in said end plate.

2. The spare wheel lift and drive assembly of claim 1, further comprising means for rotatably mounting said drive tube in said bracket; and an elongated manually rotatable tool axially projected into and frictionally engaging said drive tube.

3. The spare wheel lift and drive assembly of claim 2, said tool being a jack handle.

4. The spare wheel lift and drive assembly of claim 1, said elongated drive tube being rotatably mounted in said bracket by a nonmetallic grommet nested within said bracket for cooperatively receiving and supporting said drive tube.

5. The spare wheel lift and drive assembly of claim 1, said compound angle drive further comprising a centering sleeve having a throated axial opening adjacent and within the open end of said tube adapted to receive a jack handle having a polygonal end; and a drive sleeve secured within said tube having a corresponding polygonal aperture for drivingly receiving said jack handle.

6. The spare wheel lift and drive assembly of claim 1, said end plate being centrally apertured to loosely receive said drive sleeve; and said drive pins extending through and being riveted to said cup and to said end plate.

7. The spare wheel lift and drive assembly of claim 1, said drive cup being mounted on said drive tube by a mount sleeve axially connected to said cup, projected into and secured within said drive tube.

8. The spare wheel lift and drive assembly of claim 1, said drive disc being transverse of said drive sleeve.

9. A spare wheel lift and drive assembly for a vehicle having a frame, a downwardly facing mount bracket secured upon the underside of the frame adapted to receive a spare wheel, a lift mechanism centrally underlying the bracket and secured thereto, including a cable extending therefrom and a rotative drive arranged upon a first axis connected to the cable for selectively extending and retracting said cable and a spare wheel support connected to said cable, the improvement comprising:

a compound angle drive extending through said bracket upon a second axis intersecting and selectively arranged at an angle between 150 and 180 degrees relative to said first axis, and at one end universally connected to said rotative drive, whereby on selective rotation of said drive means the cable and wheel support retract against said spare wheel holding said wheel support and wheel in compressive retaining engagement with said mount bracket, and upon rotation in the opposite direction lowering said wheel to the ground surface;

said compound angle drive including an elongated drive tube arranged on said second axis, extending through said bracket and open at one end;

said compound angle drive means including a drive cup upon the other end of said tube;

a plurality of parallel angularly spaced drive pins arranged in a circle around said second axis and secured within said drive cup;

a drive sleeve coaxially mounted upon said rotative drive and secured thereto;

a drive disc upon one end of said drive sleeve and secured thereto, said drive disc being nested within said cup and including a plurality of spaced peripheral radial slots cooperatively receiving said drive pins respectively, said drive sleeve and said drive tube rotating in unison, an end plate fixed to said drive cup, said end plate closing said cup and enclosing said drive disc, said drive pins being secured in said end plate;

a centering sleeve having a throated axial opening adjacent and within the open end of said tube adapted to receive a jack handle having a polygonal end; and a drive sleeve secured within said tube having a corresponding polygonal aperture for drivingly receiving said jack handle.

* * * * *